W. B. SNOW.
Union Couplings.

No. 139,203.  Patented May 20, 1873.

Witnesses:
Michael Ryan
Fred Heymer

Wm. B. Snow
by his Attorneys
Brown & Allen

UNITED STATES PATENT OFFICE.

WILLIAM B. SNOW, OF BROOKLYN, ASSIGNOR TO EATON & COLE, OF NEW YORK, N. Y.

IMPROVEMENT IN UNION-COUPLINGS.

Specification forming part of Letters Patent No. 139,203, dated May 20, 1873; application filed April 9, 1873.

*To all whom it may concern:*

Be it known that I, WILLIAM B. SNOW, of Brooklyn, in the county of Kings and State of New York, have invented an Improved Union-Coupling, of which the following is a specification:

This invention is mainly designed to take the place of the ordinary pipe-coupling, in which the one section or length of pipe to be united has an external screw-thread of much greater length than that upon the other section or length of pipe to be coupled, so that by screwing an internally screw-threaded coupling onto the longer screw-threaded section of pipe to the full extent of the screw-thread on the latter, and then, or after the other section of pipe has been brought up to the first, partly unscrewing the coupling from such first section of pipe by screwing it onto the second or contiguous section, the two lengths or sections of pipe are united as required. The main object of my invention is to dispense with the elongated screw-thread on the one section of pipe, which is objectionable, not only on account of its weakening the pipe, but also as regards construction and in other respects.

The invention consists in a combination of a pipe extension-piece, provided with internal and external screw-threads, a screw socket or sleeve, and jam-nut, whereby both sections of pipe may be fitted with a limited length of screw-thread, and yet the same provision for coupling the two sections of pipe be obtained as if the one of said sections had an elongated screw-thread upon it likewise, whereby a tight and efficient coupling, generally, is produced.

Figure 1:
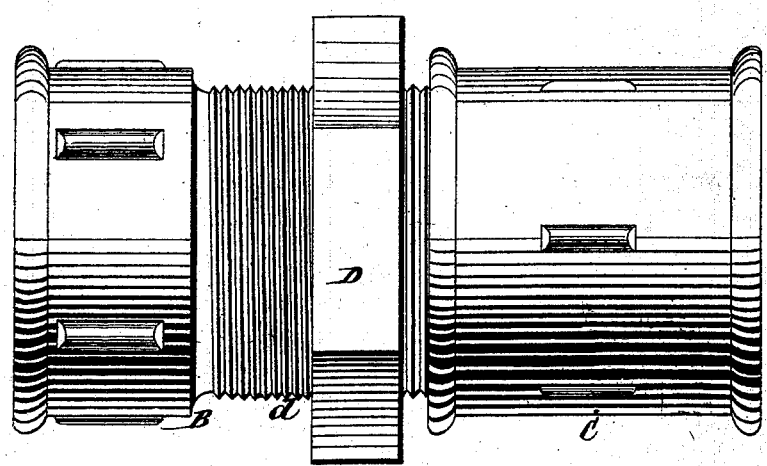
Figure 2:
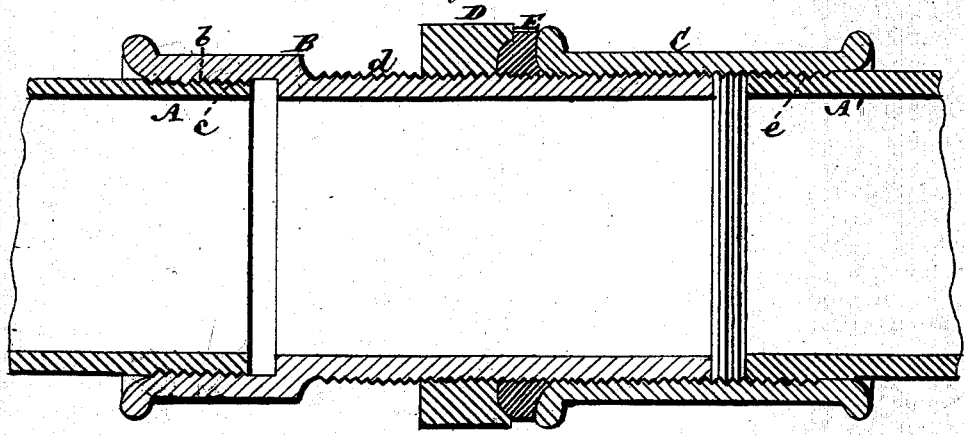

In the accompanying drawing, which forms part of this specification, Figure 1 represents a longitudinal outside view of a coupling constructed in accordance with my invention, and Fig. 2 a longitudinal sectional view of the same as applied to the ends of two lengths or sections of pipe.

Similar letters of reference indicate corresponding parts.

A represents one length or section of pipe, and A' another length or section thereof, subject to connection by my improved coupling, which is composed, in part, of a pipe extension-piece, B, having a female thread, b, on its one end for the purpose of attaching it to the pipe-section A by screwing it onto a male thread, c, thereon. The remainder of this pipe extension-piece B has an elongated external screw-thread, d, on it, corresponding in diameter and pitch with a male thread, e, on the end of the pipe-section A'.

C is the coupling-screw socket or sleeve, made to fit the screw-threads d and e, and which, prior to coupling the two lengths or sections of pipe, is screwed fully back onto the screw-thread d of the pipe extension-piece B, to admit of the contiguous ends of the pipe-sections A A' being brought into close proximity, after which said sleeve is screwed forward onto the thread e of the pipe-section A' to unite the two pipe-sections, and its forward end cemented or closed, while its back end is made tight, or leakage past the screw-thread d prevented, by a jam-nut, D, and packing E, fitted onto or over the screw-threaded portion d of the pipe extension-piece C.

What is here claimed, and desired to be secured by Letters Patent, is—

The independent pipe extension-piece B, having a female thread, b, and male thread d, as described, in combination with the coupling-screw socket or sleeve C and jam-nut D, for operation, in relation with the externally screw-threaded ends of the pipe sections or lengths A A', substantially as specified.

W. B. SNOW.

Witnesses:
 FRED. HAYNES,
 MICHAEL RYAN.